No. 860,953. PATENTED JULY 23, 1907.
R. B. WILLIAMSON.
DYNAMO ELECTRIC MACHINE.
APPLICATION FILED SEPT. 5, 1905.
2 SHEETS—SHEET 1.
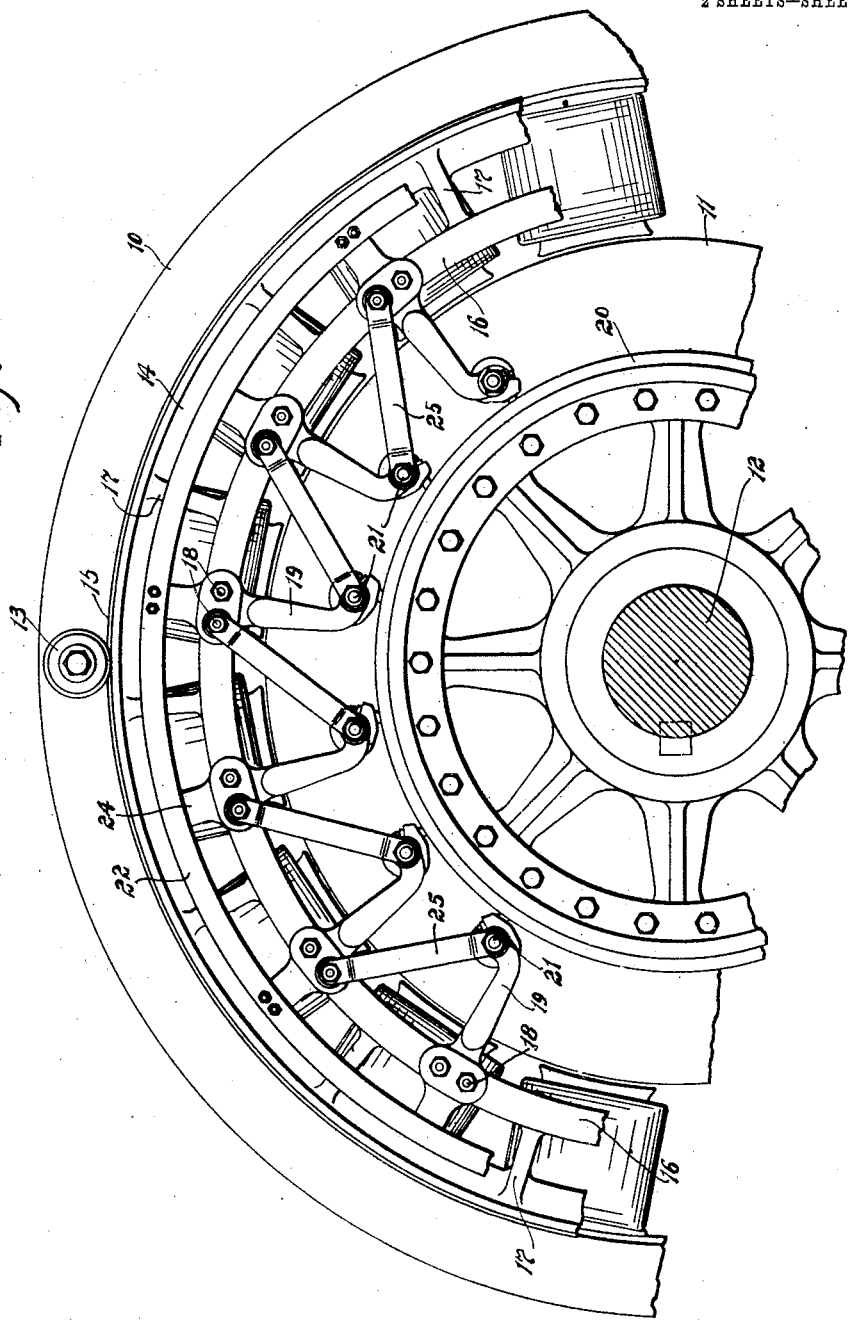
Witnesses:
George J. Schwartz
Fred J. Kinsey
Inventor:
Robert B. Williamson.
By
Chas. E. Lord
Attorney.

No. 860,953. PATENTED JULY 23, 1907.
R. B. WILLIAMSON.
DYNAMO ELECTRIC MACHINE.
APPLICATION FILED SEPT. 5, 1905.
2 SHEETS—SHEET 2.
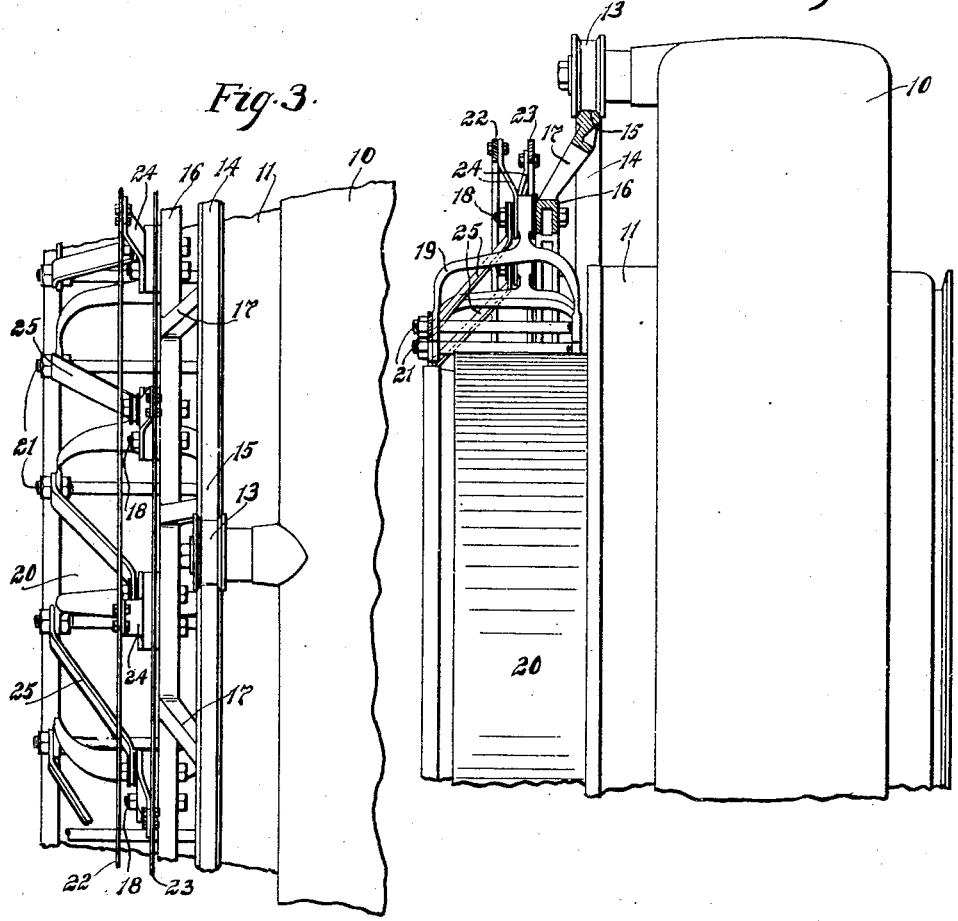
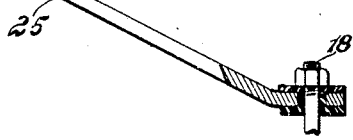
Witnesses:
George J. Schwartz.
Fred J. Kinsey
Inventor:
Robert B. Williamson.
By
Chas. E. Lord
Attorney.

UNITED STATES PATENT OFFICE.

ROBERT B. WILLIAMSON, OF NORWOOD, OHIO, ASSIGNOR TO THE BULLOCK ELECTRIC MANUFACTURING COMPANY, A CORPORATION OF OHIO.

DYNAMO-ELECTRIC MACHINE.

No. 860,953. Specification of Letters Patent. Patented July 23, 1907.

Application filed September 5, 1905. Serial No. 277,088.

*To all whom it may concern:*

Be it known that I, ROBERT B. WILLIAMSON, a citizen of the United States, residing at Norwood, in the county of Hamilton and State of Ohio, have invented certain new and useful Improvements in Dynamo-Electric Machines, of which the following is a full, clear, and exact specification.

My invention relates to dynamo electric machines and especially to the means for supporting or bracing the brush rod forks of machines of large diameter.

It has been found that in machines of large diameter having long brush forks extending from the brush yoke, there is considerable vibration in the brush forks when the machine is operated at high speed, which vibration causes a disagreeable chattering of, and injurious sparking at, the brushes. The object of my invention is therefore to so support or brace the brush forks that this vibration is entirely eliminated.

In carrying out my invention I provide the supports for the brushes with means for preventing vibratory movement.

My invention further consists of a dynamo electric machine, having a plurality of brush studs and interconnected supports therefor.

Considering my invention from a more specific standpoint, I support on the field frame of a dynamo electric machine a brush yoke having radially extending brush forks and join the inner end of each fork to the outer end of the fork adjacent thereto by means of a diagonal brace, whereby vibration of the forks is prevented.

My invention still further consists of the details of construction and combination of elements described in the specification and set forth in the appended claims.

For a more complete understanding of my invention reference is had to the accompanying drawings in which Figure 1 is a partial elevation of a dynamo electric machine embodying my invention; Fig. 2 is a side view partly in section; Fig. 3 is a plan view of a portion of the machine and Fig. 4 is a view of one of my brush fork braces showing a portion of the stud connected thereto.

Referring more specifically to the figures of the drawing, I have shown at 10, the field frame surrounding the armature 11 mounted on the shaft 12. Supported in roller bearings 13 is the brush yoke 14. As here shown the yoke consists of the outer ring 15 which engages the supporting roller bearings and the inner ring 16 joined to the outer ring by the downwardly and outwardly extending arms 17.

Joined at regular intervals to the ring 16 by bolts 18 are the brush supporting forks 19. These forks are insulated from the ring 16. The fork arms extend downward to within a suitable distance of the commutator 20 and support at their lower ends the brush studs 21, on each of which are mounted any desired number of brush holders. The forks supporting the positive brushes and the forks supporting the negative brushes are joined to the cross connecting rings 22 and 23 respectively by straps 24, in the customary manner.

In machines of large diameter, long brush forks are employed. These forks, unless made of heavy material, vibrate to a considerable extent. To eliminate this vibration, I brace the brush forks by diagonal braces 25. Each brush rod or stud is preferably connected to one of the bolts supporting the adjacent brush fork as is clearly shown in the drawings. The braces 25, one of which is shown in Fig. 4, may be made of insulating material as wood, or of metal, in which case they are suitably insulated from the rods 21, bolts 18 and brush forks. If desired, each brush fork may be braced by two braces extending from the brush rod or stud diagonally upward to the adjacent forks on each side. Also, if desired, both ends of each brush stud or each arm of the fork may be braced. For ordinary purposes however, a single brace will be sufficient. While I have shown the outer ends of the diagonal braces connected to the outer ends of the adjacent brush forks, it is evident that the said outer ends can be connected by separate bolts directly to the brush yoke, at the side of the adjacent brush forks. It will thus be seen that by means of the braces, the vibration of the forks will be eliminated.

The device is simple and can be easily applied to any machine.

I aim in my claims to cover all modifications which do not depart from the spirit of my invention.

What I claim as new, etc.:—

1. In a dynamo electric machine, a plurality of brush studs, radial forks for supporting each stud, and diagonal braces for said forks.

2. In a dynamo electric machine, a plurality of brush forks, and a diagonal brace extending from the inner end of each fork to the outer end of the adjacent fork.

3. In a dynamo electric machine, a field frame, a brush yoke supported thereon, a plurality of inwardly extending brush supporting forks extending therefrom and a diagonal brace joining the inner end of each fork to the outer end of the next adjacent fork.

4. In combination, a brush holder yoke or support, a plurality of elongated brush holders, each secured at one end to said yoke or support and separate means comprising diagonal bracing members secured to the other ends of said holders.

5. In a dynamo-electric machine, a field frame, a brush yoke, a plurality of brush forks supported on said yoke, and diagonal bracing rods, each secured at one end to the lower end of a brush fork and at its other end to the yoke, at least one end of each rod being insulated from the member to which it is attached.

In testimony whereof I affix my signature, in the presence of two witnesses.

ROBERT B. WILLIAMSON.

Witnesses:
 FRED J. KINSEY,
 CHAS. F. W. TATGENHORST, Jr.